US009434236B2

(12) United States Patent
Guillory et al.

(10) Patent No.: US 9,434,236 B2
(45) Date of Patent: Sep. 6, 2016

(54) WORK VEHICLE HVAC CONTROL BASED ON OPERATOR SEAT DIRECTION (71) Applicant: DEERE & COMPANY, Moline, IL (US)

(72) Inventors: Chris Guillory, Peosta, IA (US); Scott J. Breiner, Dubuque, IA (US); Ronald J. Huber, Dubuque, IA (US)

(73) Assignee: Deere & Company, Moline, IL (US)

( * ) Notice: Subject to any disclaimer, the term of this patent is extended or adjusted under 35 U.S.C. 154(b) by 848 days.

(21) Appl. No.: 13/801,825

(22) Filed: Mar. 13, 2013

(65) Prior Publication Data

US 2014/0273785 A1    Sep. 18, 2014

(51) Int. Cl.
| B60H 1/00 | (2006.01) |
| B60H 1/26 | (2006.01) |
| B60H 1/34 | (2006.01) |
| B60H 1/32 | (2006.01) |
| B60H 3/00 | (2006.01) |

(52) U.S. Cl.
CPC ...... B60H 1/00742 (2013.01); B60H 1/00378 (2013.01); B60H 1/00871 (2013.01)

(58) Field of Classification Search
None
See application file for complete search history.

(56) References Cited

U.S. PATENT DOCUMENTS

| 4,531,453 A * | 7/1985 | Warman | B60H 1/00378 454/139 |
| 4,612,975 A * | 9/1986 | Ikari | B60H 1/00378 165/43 |
| 4,969,533 A * | 11/1990 | Holm | B62D 21/186 180/273 |
| 5,119,718 A * | 6/1992 | Wagner | B60H 1/00378 296/208 |
| 5,308,279 A * | 5/1994 | Grinberg | B60H 1/00378 454/139 |
| 5,450,894 A * | 9/1995 | Inoue | B60H 1/00285 165/43 |
| 5,913,566 A * | 6/1999 | Stauffer | B60H 1/00378 296/190.1 |
| 6,105,667 A * | 8/2000 | Yoshinori | B60H 1/00285 165/202 |
| 6,170,274 B1 * | 1/2001 | Ichishi | B60H 1/345 236/49.3 |
| 6,347,987 B1 * | 2/2002 | Ichishi | B60H 1/00985 454/153 |
| 6,386,965 B1 * | 5/2002 | Greenwald | B60H 1/00742 165/41 |
| 6,398,294 B1 | 6/2002 | Bollweg et al. | |
| 6,692,051 B1 * | 2/2004 | Cook | B60N 2/062 296/190.01 |
| 7,334,834 B2 | 2/2008 | Hill et al. | |
| 7,726,142 B2 | 6/2010 | Keen | |
| 8,056,355 B2 | 11/2011 | Bruss et al. | |
| 2006/0113139 A1 * | 6/2006 | Nishi | B60K 28/04 180/273 |
| 2007/0044492 A1 * | 3/2007 | Ichikawa | B60H 1/00378 62/239 |

(Continued)

Primary Examiner — Gregory Huson
Assistant Examiner — Eric Gorman
(74) Attorney, Agent, or Firm — Lorenz & Kopf, LLP (57) ABSTRACT An HVAC control system for directing the flow of air in a work vehicle's HVAC system responds to the orientation of a rotating seat within the work vehicle's cabin. The seat may rotate between at least two operational positions, such that the operator of the work vehicle may control a forward or a rearward implement. The HVAC control system includes one or more detectors for detecting the position of the seat. A control module receives output from the detectors and allows or prevents the flow of air through particular ducts in the HVAC system based on the seat's position. The control module may actuate one or more doors to open and close ducts as needed. The control module may operate a first door to open or close forward ducts and a second door to open or close rearward ducts depending on whether the seat is facing forward or rearward.

10 Claims, 12 Drawing Sheets

(56) References Cited

U.S. PATENT DOCUMENTS

| | | | | |
|---|---|---|---|---|
| 2008/0128107 A1* | 6/2008 | Yoshii | ................... | B60H 1/247 165/42 |
| 2010/0216386 A1 | 8/2010 | Bruss | | |
| 2012/0295529 A1* | 11/2012 | Fukutomi | ............ | B60H 1/0005 454/152 |
| 2013/0059522 A1* | 3/2013 | Ota | ................... | B60H 1/00842 454/159 |
| 2014/0309806 A1* | 10/2014 | Ricci | ........................ | B60Q 1/00 701/1 |
| 2014/0310739 A1* | 10/2014 | Ricci | .................... | H04W 48/04 725/28 |
| 2015/0165865 A1* | 6/2015 | Park | ................... | B60H 1/00478 62/3.2 |
| 2015/0266404 A1* | 9/2015 | Sakane | ................. | B60H 1/241 454/152 |

* cited by examiner

WORK VEHICLE HVAC CONTROL BASED ON OPERATOR SEAT DIRECTION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to the heating, ventilation and air-conditioning (HVAC) systems of work vehicles, and in particular the control of HVAC systems based on operator seat positioning within the vehicle cabin.

BACKGROUND OF THE DISCLOSURE

Many types of construction implements, forestry vehicles, and other work vehicles include an operator's seat assembly that rotates between multiple operational positions to give the operator flexibility in performing tasks with the work vehicle. For example, a work vehicle may have front and rear implements, and the operator rotates his seat from a front-facing position for operating the front implement to a rear-facing position for operating the rear implement. To satisfy regulatory standards, it may be required to provide certain HVAC functionality within the vehicle cabin depending on the operational position of the seat. For example, International Organization for Standardization (ISO) standard 10263-5 requires an earth-moving vehicle that can be operated with the seat facing frontward or rearward to have defroster functionality for both the front and rear windscreens. Operator comfort is also a concern: it is desirable for the HVAC system to blow air onto the operator regardless of the seat position.

To account for all operational positions of the seat, HVAC systems for such work vehicles may be designed to provide all functionality for all seat positions at all times. Such an overbuilt system is unnecessarily complex and expensive, and is inefficient due to its provision of HVAC functionality where it is not needed. In other systems, the operator may need to manually adjust the HVAC controls when he moves the seat between operational positions. This is also inefficient, adds labor and risk of distraction, and may cause unsafe conditions if the operator does not properly adjust the controls. An HVAC control system that electronically and automatically adjusts the HVAC functionality depending on the operational position of the seat is needed.

SUMMARY OF THE DISCLOSURE

An HVAC control system, for an HVAC system of a work vehicle that has an operator's seat assembly which includes a seat that rotates between multiple operational positions, permits and restricts airflow through the HVAC system based on the position of the seat. One or more seat position detectors may be positioned to detect the position of the seat. The detectors may transmit data identifying the seat position to a control module. The control module may operate one or more HVAC system components, such as one or more doors, fans, or motors, to automatically modify airflow in response to the seat position data.

In this manner, when the operator rotates the seat from a first position to a second position, the detectors may report the position change to the control module, which may open, close, rotate, start, stop, or otherwise operate one or more of the HVAC system components to redirect airflow through the HVAC system air ducts and vents as needed to account for the second position of the seat.

Thus, in one aspect this disclosure provides: in a work vehicle having a seat that rotates between a first operational position and a second operational position, and further having an HVAC system having at least a first duct for directing air at a first area and a second duct for directing air at a second area distinct from the first area, a control system comprising: a first door that prevents air from flowing through the first duct in a closed position and allows air to flow through the first duct in an open position; a first actuator for moving the first door between at least the closed and open positions; a detector for detecting whether the seat is in at least one of the first and second operational positions and generating a position output signal based on the detected operational position; and a control module for driving the first actuator according to the position output signal of the detector.

In another aspect this disclosure provides: in a work vehicle having a cabin in which is disposed a seat assembly having a rotating seat, and further having an HVAC system with at least a first duct for delivering air through at least one vent to a first area of the cabin and a second duct for delivering air through at least one vent to a second area of the cabin distinct from the first area, an HVAC control system comprising: a door disposed in each duct and configured to move between a fully open position, allowing maximum flux of air into the duct, and a fully closed position that completely occludes the duct; a control module operatively coupled to each door to move the door between at least the fully open and fully closed positions; a marker configured to rotate with the seat; and at least one detector for detecting whether the seat is in a first operational position or a second operational position, the detector being electrically coupled to the control module for transmitting, to the control module, a position output signal indicating a position of the seat; wherein the control module moves the door of each duct according to the position output signal.

In another aspect this disclosure provides: in a work vehicle having a cabin in which is disposed a seat assembly having a rotating seat, and further having an HVAC system with a forward duct for delivering air through at least one vent to a front area of the cabin and a rearward duct for delivering air through at least one vent to a rear area of the cabin, an HVAC control system, comprising: a marker attached to a rotating structure within the seat assembly, the seat being mounted on the rotating structure; at least one detector attached to a stationary structure within the seat assembly that does not rotate with the seat, the detector being configured to detect a position of the marker and generate a position output signal that indicates the position of the seat; a first mode door assembly attached to the forward duct and comprising: a housing attached to the forward duct; a first mode door movably mounted within the housing; and an actuator attached to the housing and the first mode door for moving the first mode door between an open position that allows air into the forward duct and a closed position that occludes the forward duct; a second mode door assembly attached to the rearward duct and comprising: a housing attached to the rearward duct; a second mode door movably mounted within the housing; and an actuator attached to the housing and the second mode door for moving the second mode door between an open position that allows air into the forward duct and a closed position that occludes the forward duct; and a control module electrically connected to the detector for receiving the position output signal, and electrically connected to each of the first and second actuators to drive the actuators to move each of the first and second mode doors in response to the position output signal; wherein the position of the seat may comprise a first operational position or a second operational position.

DETAILED DESCRIPTION

As shown in the accompanying figures of the drawings described above, the following describes one or more example constructions of an HVAC control system, which can be used to automatically control the airflow through an HVAC system of a work vehicle based on the position of the operator's seat. Various modifications to the example construction(s) may be contemplated by one of skill in the art.

Figure 1:
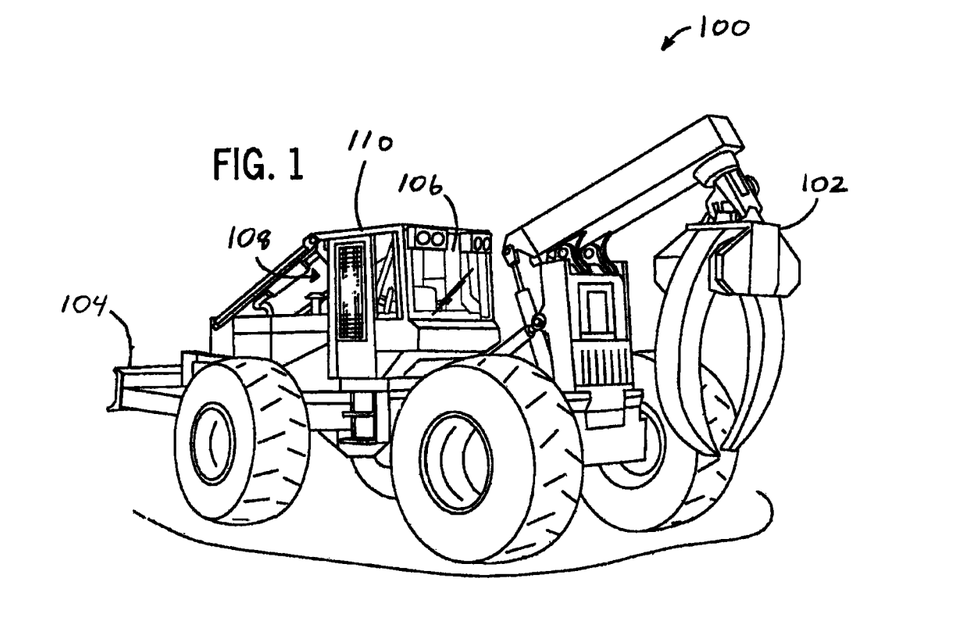
FIG. 1 is a front right perspective view of a work vehicle in which an HVAC control system according to this disclosure may be implemented.

The HVAC control system may be used in any work vehicle wherein the rotation of the operator's seat renders some HVAC ventilation components useful and others extraneous or inefficient. FIG. 1 shows an example work vehicle 100 in which the HVAC control system may be advantageously used. The work vehicle 100 has a front implement 102 and a rear implement 104, and the operator sits in the cabin 110 and looks out the front windscreen 106 to operate the front implement 102 and the rear windscreen 108 to operate the rear implement 104. The HVAC control system may be utilized in various work vehicles, having various configurations of implements, such as those for forestry, construction, or agricultural tasks. As such, the term "work vehicle" is not limited to the illustrated work vehicle 100, commonly known as a grapple skidder, but may be a tractor, bulldozer, loader, grader, excavator, or harvester, a combination thereof, or another suitable vehicle having a rotating seat and an HVAC system. The HVAC control system may be installed as an original factory component of the work vehicle's HVAC system, or the HVAC control system may be retrofit to the HVAC system of an existing work vehicle.

Figure 2:
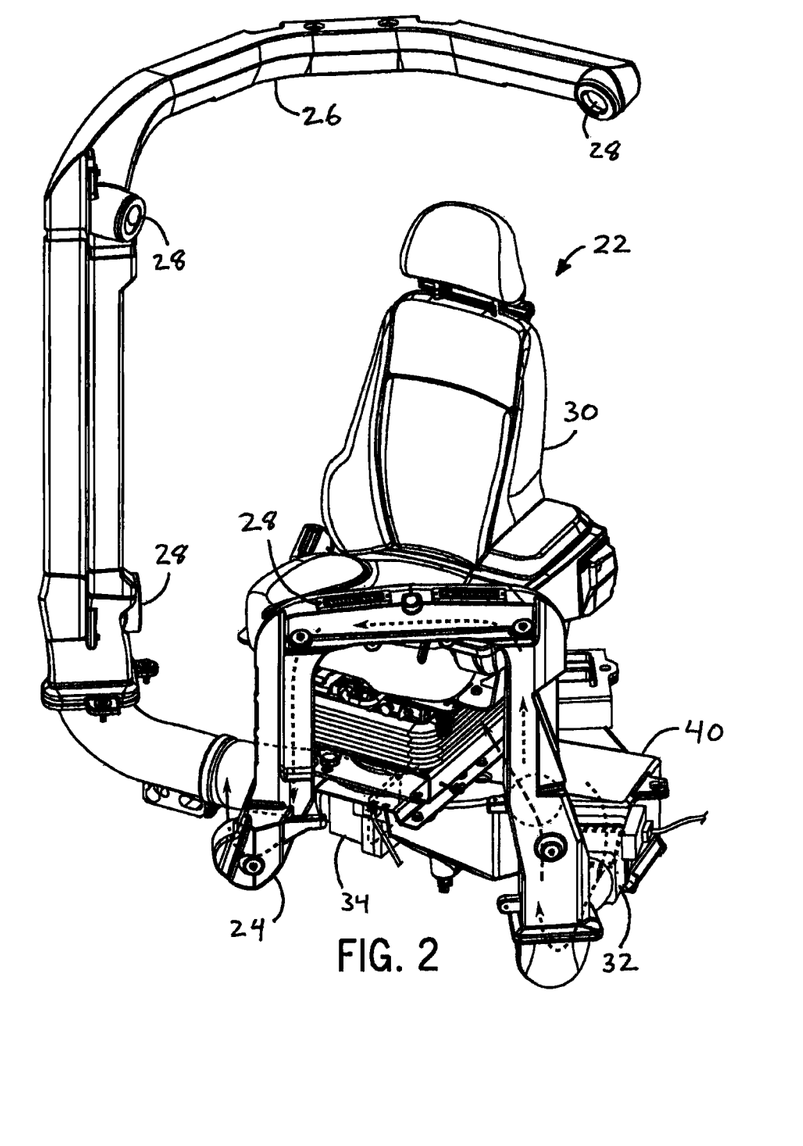
FIG. 2 is a top front perspective view of a seat assembly and a portion of an HVAC system thereof.
Figure 3:
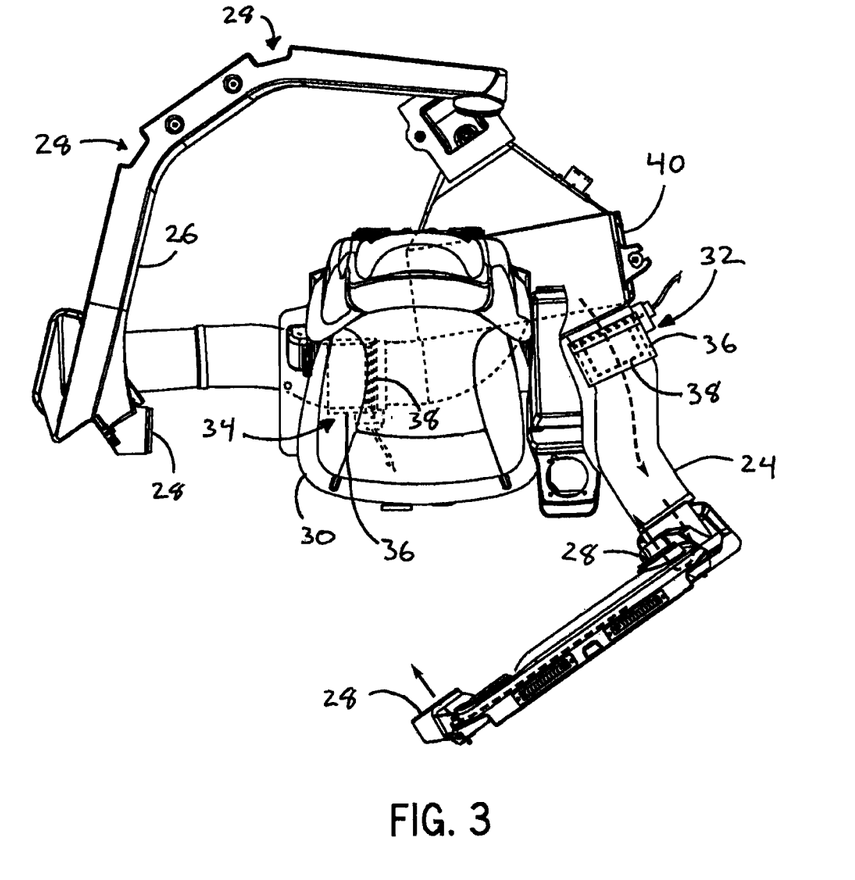
FIG. 3 is a top view thereof.
Figure 4:
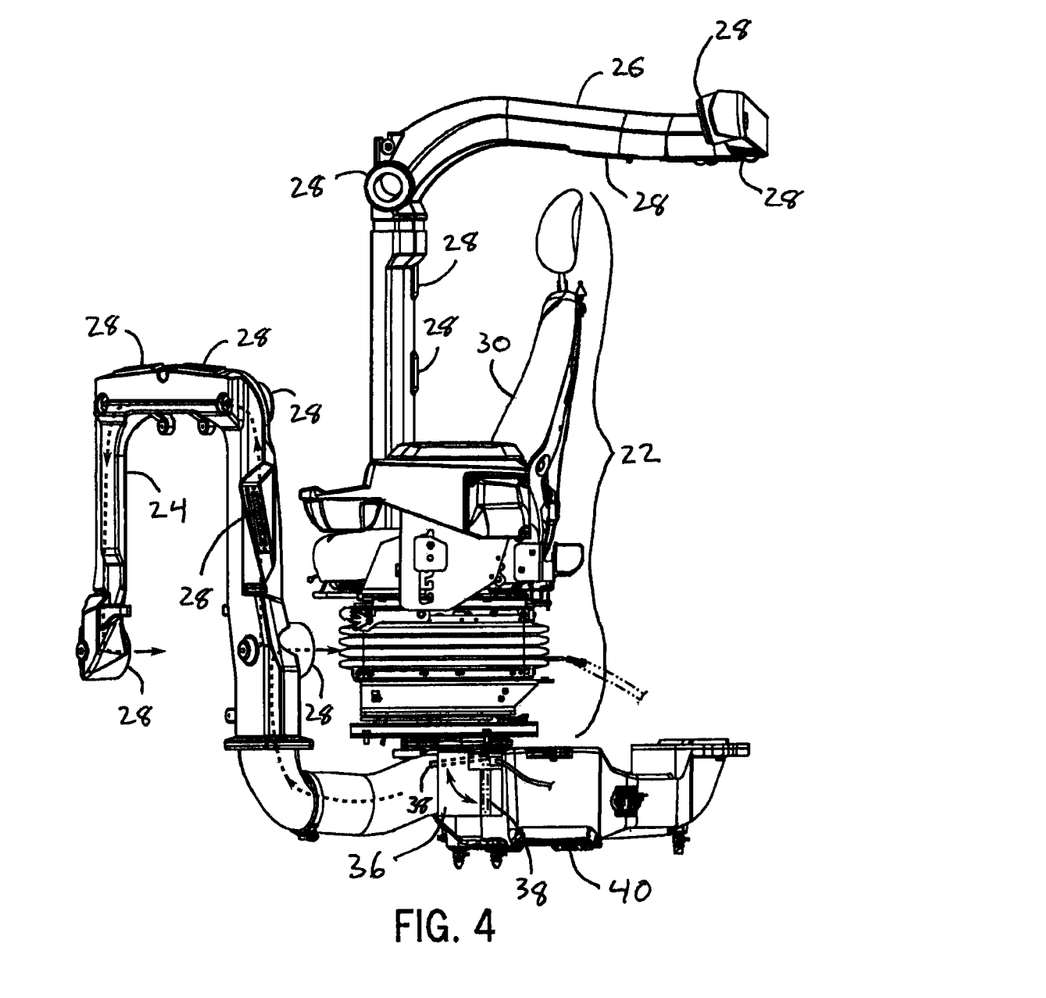
FIG. 4 is a left side view thereof.

FIGS. 2-4 show an example implementation of the HVAC control system in the cabin of a work vehicle in which a seat assembly 22 is positioned between a forward HVAC duct 24 that directs air from the HVAC system to a front area of the cabin and a rearward HVAC duct 26 that directs air from the HVAC system to a rear area of the cabin. The front area of the cabin may be an area that includes, without limitation, some or all of the front windscreen 106, a floor area, and any of the cabin space in front of the operator when he is facing forward in the cabin. The rear area of the cabin may be an area that includes, without limitation, some or all of the rear windscreen 108, a floor area, and any of the cabin space in front of the operator when he is facing rearward in the cabin. One or more vents 28 on the ducts 24, 26 emit air into the respective areas. Vents 28 on the forward duct 24 may direct heated or cooled air onto the front windscreen 106 to defrost the front windscreen 106, along the floor to heat or cool the operator's feet and legs, or into the space in front of the operator to heat or cool the operator's face, torso, or hands, provided the operator is facing forward. Vents 28 on the rearward duct 26 may direct heated or cooled air onto the rear windscreen 108 to defrost the rear windscreen 108, along the floor to heat or cool the operator's feet and legs, or into the space in front of the operator to heat or cool the operator's face, torso, or hands, provided the operator is facing rearward. Emission of air from some or all of the vents 28 on either of the ducts 24, 26 may be unnecessary when the operator is facing away from the vents 28. For example, vents 28 on the forward duct 24 for heating or cooling the operator may direct air at the back of the operator's seat when the operator is facing rearward.

The seat assembly 22 includes a seat 30 on which the operator sits to operate the work vehicle and its implements. The seat 30 may be configured to rotate around a vertical axis between at least a first operational position and a second operational position. The operational positions may correspond to the positions of one or more of the vents 28 on the ducts 24, 26 as described above. In one of the operational positions, the seat 30 may face substantially forward, "substantially" meaning that the operator may comfortably look out the front windscreen to drive the work vehicle forward or operate the front implement and be heated or cooled by vents 28 on the forward duct 24. In the forward operational position, the seat 30 may face directly forward or be offset from facing directly forward up to about 90 degrees. For example, the seat 30 is offset about 35 degrees from directly forward. In another operational position, the seat 30 may face substantially rearward, "substantially" meaning that the operator may comfortably look out the rear windscreen to drive the work vehicle in reverse or operate the rear implement and be heated or cooled by vents 28 on the rearward duct 26. In the rearward operational position, the seat 30 may face directly rearward or be offset from facing directly rearward up to about 90 degrees. For example, the seat 30 is offset about 30 degrees from directly rearward. In the example of FIGS. 2-4, the HVAC control system responds to the forward and rearward operational positions of the seat 30 as described herein. It will be understood that the seat 30 may have different or additional operational positions that cause the HVAC control system to respond. Furthermore, the seat 30 may have intermediate, non-operational positions that cause the HVAC control system to respond in the manner described herein.

It would be advantageous for the air within the HVAC system to travel primarily through the forward duct 24 when the seat 30 is in the forward position, as illustrated in FIGS. 2-4, and to travel primarily through the rearward duct 26 when the seat 30 is in the rearward position. It would further be advantageous for the air to be restricted through the rearward duct 26 when the seat 30 is in the forward position, as illustrated in FIGS. 2-4, and to be restricted through the forward duct 24 when the seat 30 is in the rearward position. The HVAC control system may comprise one or more mode door assemblies 32, 34 positioned and configured to permit or restrict airflow through one or more of the forward duct 24, rearward duct 26, and other duct in the HVAC system. A mode door assembly may comprise a mode door 38 mounted in a housing 36. The housing 36 may serve as an interface between adjoining sections of the HVAC system. In an embodiment according to the illustrations, the HVAC system may include a core housing 40 that contains one or more heating or cooling cores with liquid or air circuits for heating or cooling air as is known in the art. Correspondingly, the HVAC control system may include a first mode door assembly 32 with a housing 36 that attaches between the HVAC core housing 40 and the forward duct 24 and a second mode door assembly 34 with a housing 36 that attached between the HVAC core housing 40 and the rearward duct 26. The mode door 38 may move between a fully open position, allowing maximum flux of air through the mode door 38 into the duct, and a fully closed position that completely occludes the duct.

Each mode door 38 may have an open position that is not fully open and a closed position that is not fully closed, and depending on the desired functionality, each mode door 38 may have additional intermediate positions between open and closed. The mode doors 38 of both the first 32 and second 34 mode door assemblies may be positioned to allow air to flow simultaneously to both the forward 24 and rearward 26 ducts, at either the same or different flow volumes and rates. The positions of the mode doors 38 may permit a restricted volume of air to pass through, or may redirect air to a subset of the vents 28 within a particular section of the duct, such as for defrosting purposes.

When the operator seat 30 is in its forward position, each mode door 38 of the first 32 and second 34 mode door assemblies may partially occlude the forward 24 and rearward 26 ducts differently so as to allow a greater percentage of the overall air flow in the HVAC system to flow through the forward duct 24 than through the rearward duct 26. Conversely, when the operator seat 30 is in the rearward position, the mode doors 38 of the first 32 and second 34 mode door assemblies may be set to provide greater air flow through the rearward duct 26 than the forward duct 24. In this way, the percentage of the volume of air in the HVAC system may be tailored to the seat 30 direction, while still permitting air flow at both operational sides of the vehicle cabin. By way of example, the HVAC system could be operated to provide approximately an 80/20 air flow differential between the two operational positions, with the higher air flow volume being directed to the area in front of where the seat 30 faces. One way to achieve this when the mode doors 38, or the ducts 24, 26, are of equal area is to adjust each mode door 38 to occlude a corresponding percentage of the associated opening. For example, to preferentially heat or cool the forward area of the cabin when the seat is in its forward position, the mode door 38 of the first mode door assembly 32 can be adjusted to occlude only about 20 percent of the opening to the forward duct 24 while the mode door 38 of the second mode door assembly 34 is set to occlude about 80 percent of the rearward duct 26. Such positioning of the mode doors 38 may be configurable by the operator, for example by providing input through an HVAC control panel or other vehicle control interface. That is, the operator may identify one or more desired intermediate positions for the mode doors 38, or may set the degree to which the ducts 24, 26 are occluded when each mode door 38 is in its open or closed position.

Figure 5:
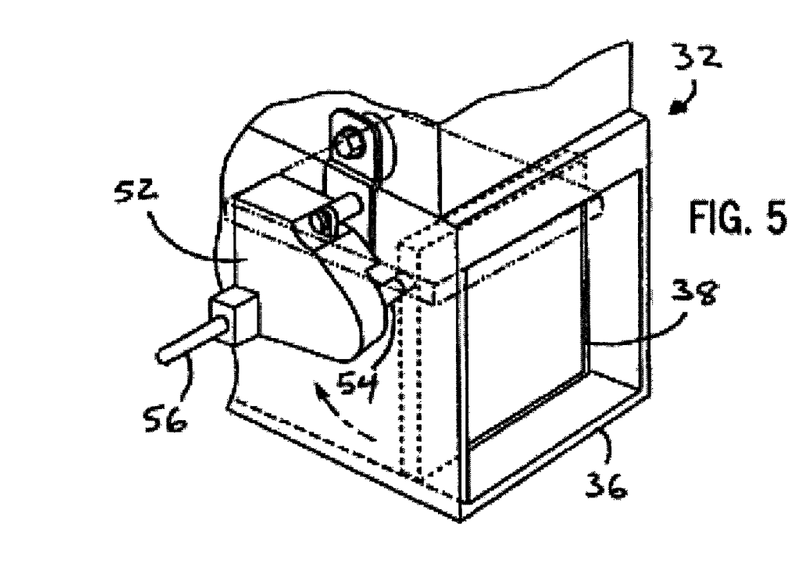
FIG. 5 is a perspective view of a mode door moving from closed to open position.

FIG. 5 is a close-up view of an example of a mode door assembly 32. The mode door assembly 32 may comprise one or more mode door motors 52, which may be mounted to the housing 36 and attached to the mode door 38. The mode door motor 52 may be physically attached to the mode door 38, such as by an actuator for moving the mode door 38, or by another structure. The mode door motor 52 may be communicatively attached to the mode door 38, such as by electronically operating an actuator attached to the mode door. The mode door motor 52 may retain the mode door 38 within the housing 36, as in the illustrated embodiment wherein a rigid axle 54 attaches the mode door motor 52 to the mode door 38 while also serving as the actuator for the mode door 38. The axle 54 may keep the mode door 38 stationary in any of the mode door's 38 positions. The mode door motor 52 may rotate the mode door 38 between its various positions by rotating the axle 54. The axle 54 may attach to the mode door 38 at the top (as illustrated), middle, or bottom of the mode door 38, or at any intermediate point, as needed to satisfy the desired functions of the mode door 38. In other embodiments, the mode door 38 may be directly attached to the housing 36, such as with a hinge, and the mode door motor 52 merely configured to move the mode door 38 and not necessarily to retain it in the housing 36. One or more cables 56 may connect the mode door motor 52 to a power supply (not shown), and further may electronically connect the mode door motor 52 to the HVAC control module as described below.

Figure 6:
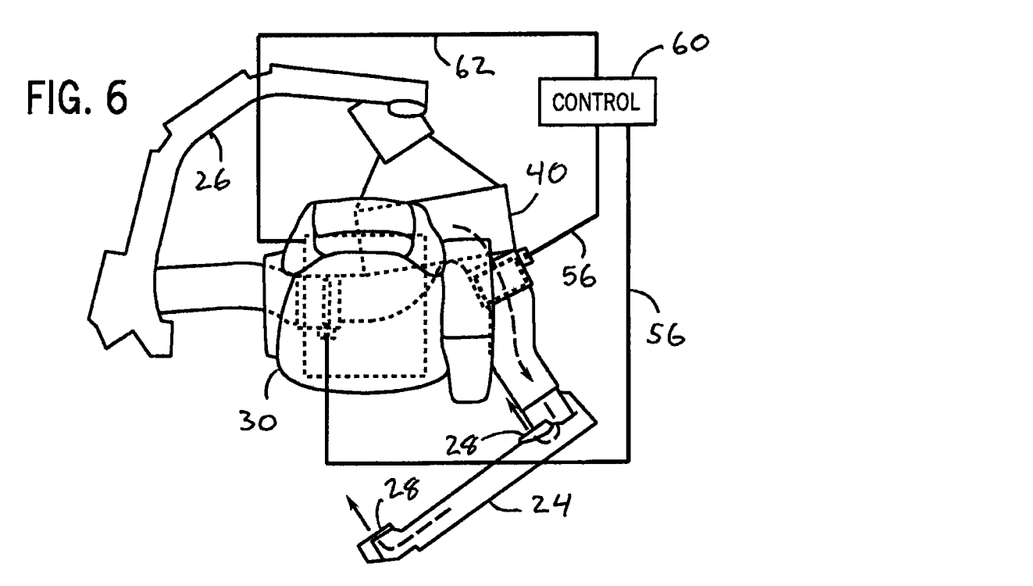
FIG. 6 is a schematic diagram of controlling airflow through the HVAC system when the seat is in a first position.
Figure 7:
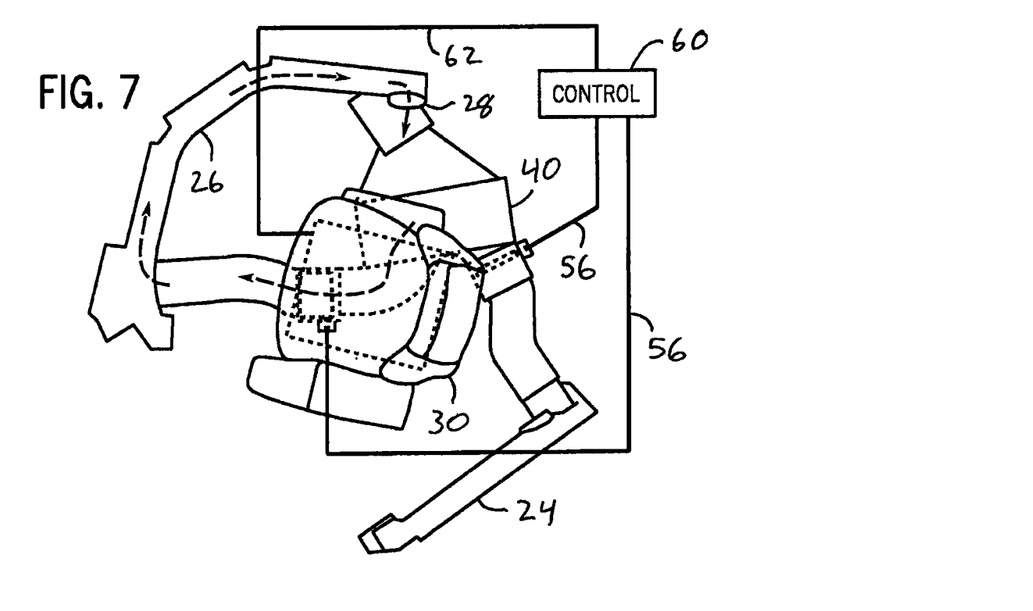
FIG. 7 is a schematic diagram of controlling airflow through the HVAC system when the seat is in a second position.

Referring to FIGS. 6 and 7, the cables 56 connect the mode door assemblies 32, 34 to the HVAC control module 60. The control module 60 may use software, hardware, or a combination thereof to transmit instruction signals to one or more of the mode door motors 52 in the mode door assemblies 32, 34. The instruction signals may instruct the mode door motors 52 to open, close, or otherwise position the mode doors 38. In this manner, the control module 60 redirects airflow through the HVAC system. For example, in FIG. 6 the seat 30 is in the forward operational position and the control module 60 has instructed a mode door motor 52 in the first mode door assembly 32 to open the respective mode door 38, and has instructed a mode door motor 52 of the second mode door assembly 34 to close the respective the mode door 38. This arrangement provides airflow from the HVAC core housing 40 through the housing 36 of the first mode door assembly 32, into the forward duct 24, and out of the corresponding vents 28, while restricting or preventing airflow into the rearward duct 26. Moving the seat 30 from the front operational position of FIG. 6 to the rear operational position of FIG. 7 causes the control module 60 to instruct the mode door motor 52 in the first mode door assembly 32 to close its respective mode door 38, and to instruct the mode door motor 52 of the second mode door assembly 34 to open its respective mode door 38. This arrangement provides airflow from the HVAC core housing 40 through the housing 36 of the second mode door assembly 34 into the rearward duct 26 and out of the corresponding vents 28, while restricting or preventing airflow into the forward duct 24. In order to send the relevant instruction signals, the control module 60 may receive a position output signal from one or more detectors over one or more sensor lines 62 as described below.

The seat 30 position may be detected using any suitable detection means, including electronic mechanisms, magnetic mechanisms, mechanical mechanisms, or a combination thereof. Some embodiments may include electronic, optical, or inductive sensors that detect motion, proximity, torque, or contact and generate a position output signal based on the presence, absence, or movement of a marker on the seat 30. In other embodiments, rotating the seat 30 may cause an element of the seat assembly 22 to depress one or more buttons, toggle one or more switches, slide one or more sliders, turn one or more knobs, or activate some other signaling device to cause the transmission of the position output signal to the control module. In any manner, position data may be collected in response to movement of the seat 30. That is, the movement of the seat 30 may cause the detectors to transmit the position output signal to the control module. Position data may additionally or alternatively be collected when the seat 30 reaches a certain position, such as when the seat 30 locks into an operational position as described below with reference to the figures.

Figure 8:
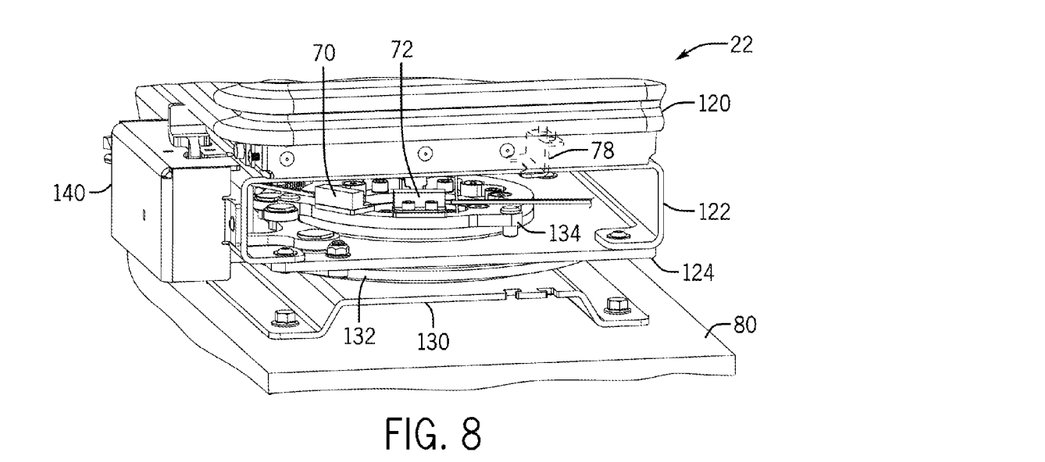
FIG. 8 is a partial top front right perspective view of the base of the seat assembly of FIG. 2.
Figure 9:
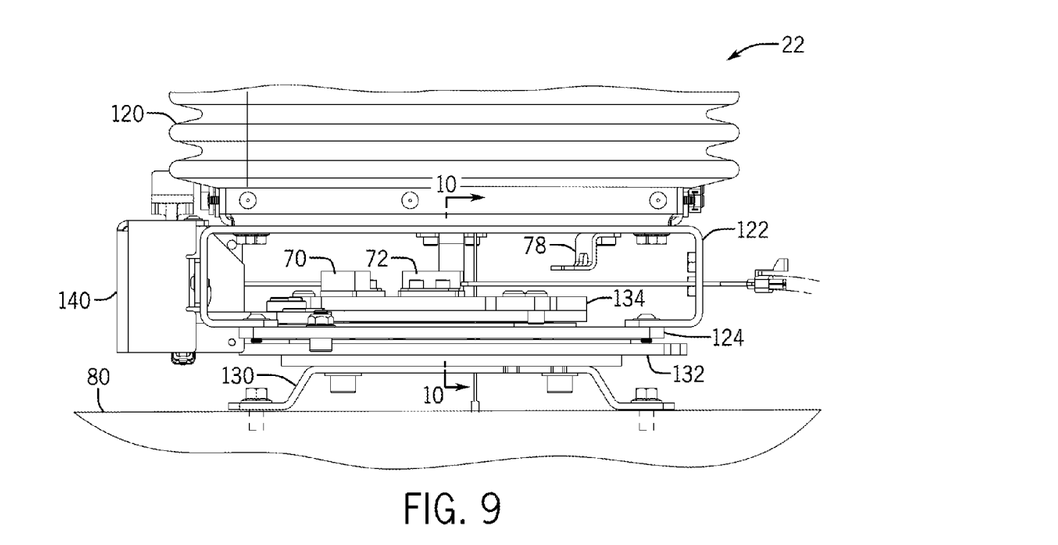
FIG. 9 is a partial front view thereof.
Figure 10:
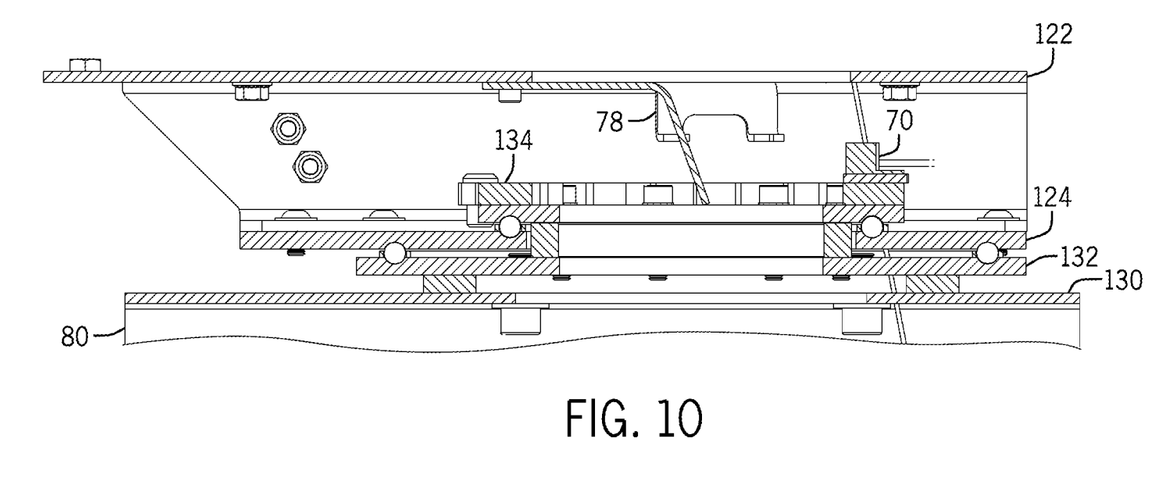
FIG. 10 is a partial right side cross-sectional view of the base of the seat assembly taken along line 10-10 of FIG. 9.

FIGS. 8-13 are detailed illustrations of an embodiment of the seat assembly 22 and one possible arrangement of elements for detecting the position of the seat 30 and transmitting the position data to the control module. Referring to FIGS. 8-10, the seat assembly 22 may include one or more mounting plates 122, 124 to which the seat 30 or an intermediate seat stabilizing assembly 120 may be attached. The seat 30 rotates with the mounting plates 122, 124 around a stationary base. The stationary base may include, without limitations upon parts or arrangement: a base bracket 130 affixed to a support surface 80 of the vehicle cabin; an interface plate 132 attached to the base bracket 130 and cooperating with one or more of the mounting plates 122, 124 to facilitate rotation of the seat 30; and a positioning plate 134 attached to the base bracket 130 and comprising one or more structures for positioning the seat 30. One or more detectors 70, 72 may be attached to the stationary base in a position, such as to the top of the positioning plate 134, to detect rotation of the seat 30 by detecting movement of one of the rotating structures, such as the mounting plates 122, 124 or a marker 78 attached thereto. The marker 78 may be any suitable structure for interacting with the detectors 70,72 to cause a position output signal therefrom. For example, if the detectors 70, 72 are magnetic sensors, the marker 78 may be a metal or other conductive bracket that causes the inductance of one or more of the sensors to change, producing an output signal from the sensors, when the marker 78 approximates the detectors 70, 72. By "approximates," it is meant that the marker 78 comes close enough to the detectors 70, 72 to activate the production of an output signal; therefore, a suitable distance may depend on the type of detector 70, 72 used but will be determined by known parameters of the detector. For example, a magnetic sensor may require a conductive bracket to come within about 5 mm of the magnetic sensor to cause the necessary change in inductance. Some embodiments may include one or more detectors 70, 72 for each operational position of the seat 30. Other embodiments may arrange one or more detectors 70, 72 so that the operational positions may be detected without placing a detector 70, 72 at every operational position. The seat assembly 22 may further include an override assembly 140 that releases the seat 30 from a locked position as described below.

Figure 11:
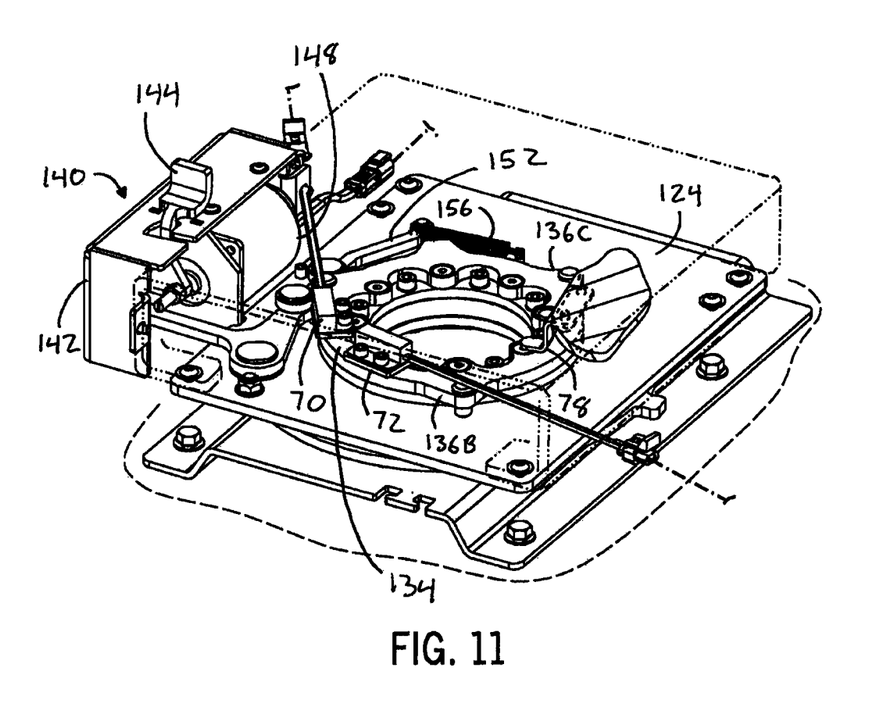
FIG. 11 is a top front left perspective view of the base of the seat assembly of FIG. 2.
Figure 12:
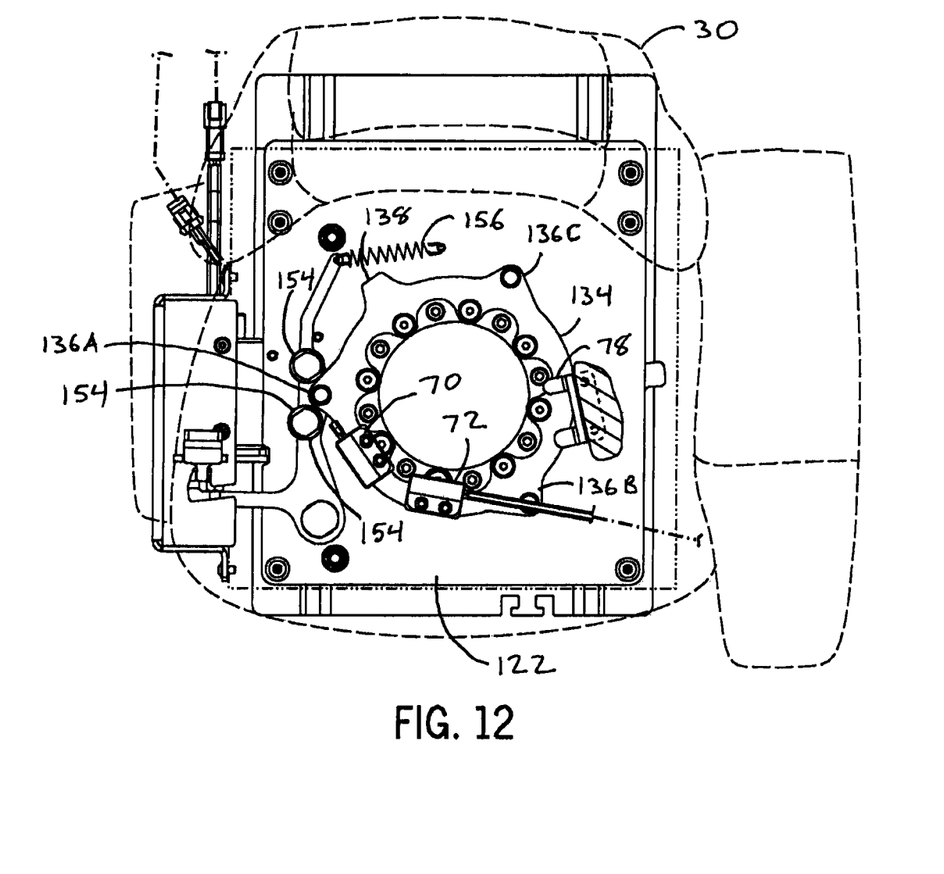
FIG. 12 is a top view thereof, with the seat shown in outline in a first position.
Figure 13:
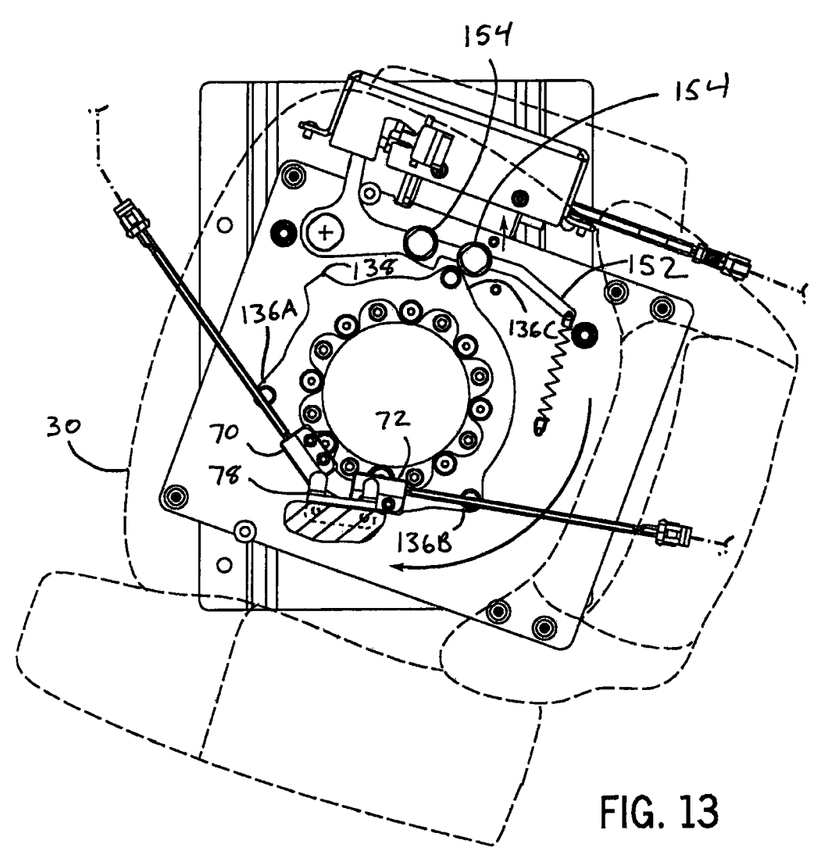
FIG. 13 is a top view thereof, with the seat shown in outline in a second position.

Referring to FIGS. 11-13, a pivoting arm 152 may facilitate rotational operation of the seat assembly 22, and the corresponding detection of the seat 30 position. The arm 152 may attach to one of the rotating structures, such as the top surface of the lower mounting plate 124, in a position that allows the arm 152 to engage the positioning plate 134. In particular, one or more rollers 154 attached to the arm 152 may engage one or more lobes 136A-C on the positioning plate 134, each lobe 136A-C corresponding to a substantially locked position of the seat 30. In the illustrated example, a first lobe 136A corresponds to the front operational position, a second lobe 136B corresponds to an intermediate position, and a third lobe 136C corresponds to the rear operational position. For example, each lobe 136A-C may fit between two rollers 154 to lock the seat 30 in the corresponding position. The arm 152 may be biased against the positioning plate 134 by attaching a non-pivoting end of the arm 152 to a rotating structure, such as the lower mounting plate 124, with a biasing structure such as a spring 156. As the seat 30 rotates, the rollers 154 may, with rotational force applied by the operator, roll over a lobe 136 A-C against the biasing force of the spring 156. The positioning plate 134 may further include a barrier 138 that prevents rotation of the seat 30 when a roller 154 contacts it.

With the seat 30 in the front operational position of FIG. 12, the HVAC control system routes air through the HVAC system to the appropriate vents for the front operational position, as shown in FIG. 6. When the operator rotates the seat to the rear operational position of FIG. 13, the marker 78 is brought into cooperation with the detectors 70, 72. The detectors 70, 72 detect that the seat 30 has been rotated to its rear operational position, and transmit the proper position output signal to the control module, which redirects the air through the HVAC system to the appropriate vents for the rear operational position, as shown in FIG. 7. The control module may send instruction signals to the mode door motors based on the position output signal received from a single detector 70, 72, a subset of the detectors 70, 72 in the system, or all of the detectors 70, 72. For example, as illustrated in FIG. 13, the marker 78 may cooperate with both detectors 70, 72 only when the seat 30 is fully in its rear operational position, and the control module will only redirect air to the rear duct in this condition. Thus, once the operator begins to move the seat 30 toward another position, simultaneous cooperation with both detectors 70, 72 is broken, the control module receives new a position output signal (or ceases receiving output) indicating a repositioned seat 30 and may redirect the air in response.

Seat direction-based control of the HVAC system by the HVAC control system may be overridden manually using the override assembly 140. The override assembly 140 may include a housing 142 for a solenoid 148 or other HVAC power supply. Pressing a button 144 or other actuator outside the housing 142 activates the solenoid 148, which transmits an override signal to the control module. The control module may then perform override tasks, such as opening all mode doors, maximizing HVAC heater or compressor power, or activating or deactivating motors as needed.

Figure 14:
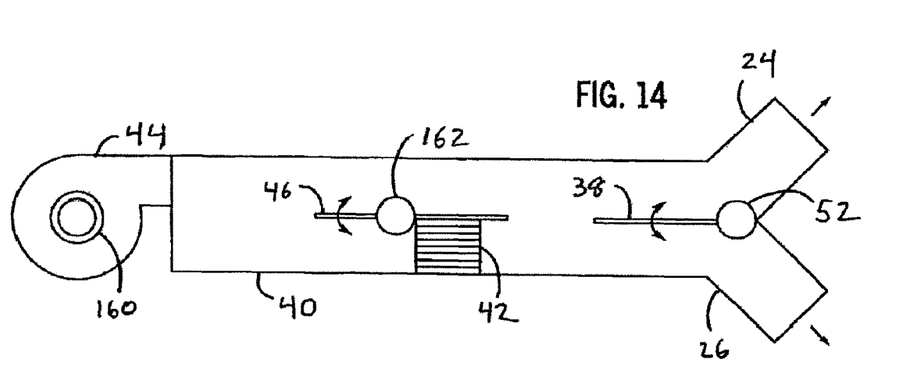
FIG. 14 is a schematic diagram of a portion of an HVAC system.
Figure 15:
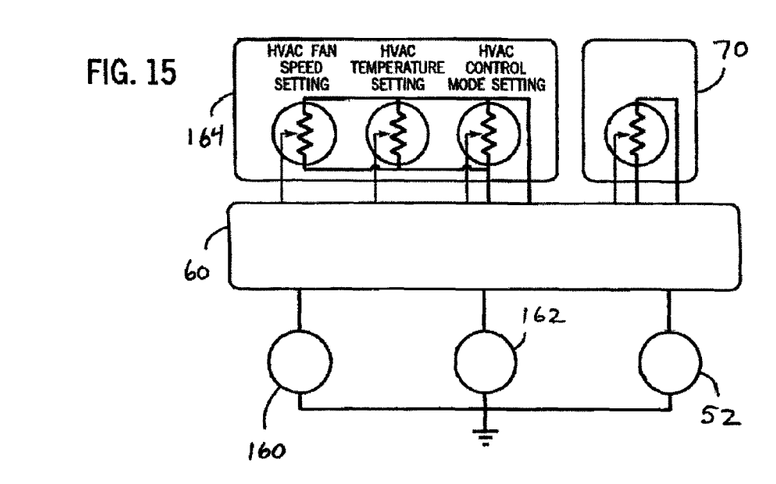
FIG. 15 is a schematic diagram of an HVAC control system.

FIGS. 14 and 15 are schematic examples of an additional or alternative embodiment of an HVAC control system in which a single mode door 38 may be used to open or close one or both of the forward duct 24 and rearward duct 26. An HVAC blower 44, operated by a blower motor 160, blows air into the HVAC core housing 40, which houses a heater core 42 and a temperature control door 46 operated by a temperature control motor 162. The control module 60 may place the mode door 38 in a first position that fully occludes the forward duct 24, so that air is directed into the open rearward duct 26, and a second position that fully occludes the rearward duct 26, so that air is directed into the open forward duct 24. The control module 60 may further place the mode door 38 in a third position, shown in FIG. 15, that leaves both ducts 24, 26 open. The control module 60 may further place the mode door 38 in one or more positions intermediate the first, second, and third positions, which may partially occlude one of the ducts 24, 26 so that a lesser flow of air is directed into the partially occluded duct. The control module 60 may use input from a detector 70, as described above, to operate the mode door 38 in response to the seat 30 position. The control module 60 may further operate the mode door 38, and other doors, motors, and operable components of the HVAC system, based on input received from operator HVAC controls 164. The control module 60 may activate, deactivate, or change the speed of the blower motor 160, activate the temperature control motor 162 to move the temperature control door 46, and activate the mode door motor 52 to move the mode door 38 between directing air into the forward duct 24 and directing air into the rearward duct 26. The control module 60 may be configured to perform any of these HVAC operations, or other vehicular operations such as activating and deactivating cabin or exterior lights or implement controls, based on the seat 30 position as detected by the detector 70.

The foregoing detailed description describes the subject of this disclosure in one or more examples. A skilled person in the art to which the subject matter of this disclosure pertains will recognize many alternatives, modifications and variations to the described example(s). The scope of the invention is thus defined not by the detailed description, but rather by the following claims.

What is claimed is:

1. A control system for a work vehicle having a seat that rotates between a first operational position and a second operational position, and further having an HVAC system having at least a first duct for directing air at a first area and a second duct for directing air at a second area distinct from the first area, the control system comprising:
    a first door that prevents air from flowing through the first duct in a closed position and allows air to flow through the first duct in an open position;
    a first actuator for moving the first door between at least the closed and open positions;
    a detector for detecting whether the seat is in at least one of the first and second operational positions and generating a position output signal based on the detected operational position; and
    a control module for driving the first actuator according to the position output signal of the detector.

2. The control system of claim 1, wherein the first door prevents air from flowing through the second duct in a second closed position and allows air to flow through the second duct in the open position, and wherein the first actuator further moves the first door between the open position and the second closed position.

3. The control system of claim 2, wherein the first door allows air to flow through the first duct when preventing air from flowing through the second duct, and allows air to flow through the second duct when preventing air from flowing through the first duct.

4. The control system of claim 1, further comprising:
    a second door that prevents air from flowing through the second duct in a closed position and allows air to flow through the second duct in an open position; and
    a second actuator for moving the second door between at least the closed and open positions of the second door;
    wherein the control module drives the second actuator according to the position output signal of the detector.

5. The control system of claim 4, wherein the control module drives the first actuator to open the first door when driving the second actuator to close the second door.

6. The control system of claim 1, wherein the control module drives the first actuator to move the first door to the open position when the detector detects that the seat is in the first operational position; and
    wherein the control module drives the first actuator to move the first door to the closed position when the detector detects that the seat is not in the first operational position.

7. The control system of claim 1, wherein the control module drives the first actuator to move the first door to the open position when the detector detects that the seat is in the first operational position; and
    wherein the control module drives the first actuator to move the first door to the closed position when the detector detects that the seat is in the second operational position.

8. The control system of claim 7, wherein the first area is a front area of the work vehicle and the seat faces substantially forward in the first operational position.

9. The control system of claim 8, wherein the second area is a rear area of the work vehicle and the seat faces substantially rearward in the second operational position.

10. The control system of claim 1 further comprising a marker that rotates with the seat, wherein the detector detects whether the seat is in one of the operational positions by detecting the position of the marker.

* * * * *